United States Patent
Bronson et al.

(10) Patent No.: US 10,572,385 B2
(45) Date of Patent: *Feb. 25, 2020

(54) GRANTING EXCLUSIVE CACHE ACCESS USING LOCALITY CACHE COHERENCY STATE

(71) Applicant: INTERNATIONAL BUSINESS MACHINES CORPORATION, Armonk, NY (US)

(72) Inventors: Timothy C. Bronson, Round Rock, TX (US); Garrett M. Drapala, Cary, NC (US); Pak-Kin Mak, Poughkeepsie, NY (US); Vesselina K. Papazova, Highland, NY (US); Hanno Ulrich, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,154

(22) Filed: Dec. 8, 2017

(65) Prior Publication Data

US 2018/0101474 A1 Apr. 12, 2018

Related U.S. Application Data

(63) Continuation of application No. 14/518,428, filed on Oct. 20, 2014, now Pat. No. 9,852,071.

(51) Int. Cl.
*G06F 12/0815* (2016.01)
*G06F 12/14* (2006.01)
(Continued)

(52) U.S. Cl.
CPC ...... *G06F 12/0815* (2013.01); *G06F 12/0813* (2013.01); *G06F 12/0835* (2013.01);
(Continued)

(58) Field of Classification Search
None
See application file for complete search history.

(56) References Cited

U.S. PATENT DOCUMENTS 6,631,447 B1 * 10/2003 Morioka ............. G06F 12/0815
711/118
6,829,683 B1 12/2004 Kuskin
(Continued)

FOREIGN PATENT DOCUMENTS

EP 0936552 A2 4/2006

OTHER PUBLICATIONS

"z/Architecture—Principles of Operation," Publication No. SA22-7832-09, 10th Edition, Sep. 2012, 1568 pages.
(Continued)

*Primary Examiner* — Charles J Choi
(74) *Attorney, Agent, or Firm* — William A. Kinnaman, Jr., Esq.; Kevin P. Radigan, Esq.; Heslin Rothenberg Farley & Mesiti P.C.

(57) ABSTRACT

A cache coherency management facility to reduce latency in granting exclusive access to a cache in certain situations. A node requests exclusive access to a cache line of the cache. The node is in one region of nodes of a plurality of regions of nodes. The one region of nodes includes the node requesting exclusive access and another node of the computing environment, in which the node and the another node are local to one another as defined by a predetermined criteria. The node requesting exclusive access checks a locality cache coherency state of the another node, the locality cache coherency state being specific to the another node and indicating whether the another node has access to the cache line. Based on the checking indicating that the another node has access to the cache line, a determination is made that the node requesting exclusive access is to be granted exclusive access to the cache line. The determining
(Continued)

being independent of transmission of information relating to the cache line from one or more other nodes of the one or more other regions of nodes.

20 Claims, 15 Drawing Sheets

(51) Int. Cl.
*G06F 12/0813* (2016.01)
*G06F 12/0831* (2016.01)

(52) U.S. Cl.
CPC .... *G06F 12/1416* (2013.01); *G06F 2212/314* (2013.01); *G06F 2212/50* (2013.01); *G06F 2212/621* (2013.01); *G06F 2212/622* (2013.01)

(56) References Cited

U.S. PATENT DOCUMENTS

| | | | |
|---|---|---|---|
| 6,976,132 B2 | 12/2005 | Dieffenderfer et al. | |
| 7,107,410 B2 | 9/2006 | Yang | |
| 7,213,109 B1 | 5/2007 | Bauman et al. | |
| 7,287,126 B2 | 10/2007 | Desai | |
| 7,409,504 B2 | 8/2008 | Rajamony et al. | |
| 7,752,396 B2 | 7/2010 | Dieffenderfer et al. | |
| 7,818,391 B2 | 10/2010 | Van Doren et al. | |
| 8,301,843 B2 | 10/2012 | Gunna et al. | |
| 9,798,663 B2 | 10/2017 | Bronson et al. | |
| 2003/0056068 A1* | 3/2003 | McAllister | G06F 12/0822 711/156 |
| 2006/0053258 A1 | 3/2006 | Liu et al. | |
| 2006/0271743 A1* | 11/2006 | Clark | G06F 12/0831 711/141 |
| 2008/0270708 A1 | 10/2008 | Warner et al. | |
| 2013/0159636 A1* | 6/2013 | Akiu | G06F 12/0826 711/148 |
| 2013/0339609 A1 | 12/2013 | Bronson et al. | |
| 2016/0110287 A1 | 4/2016 | Bronson et al. | |

OTHER PUBLICATIONS

Garcia-Guirado, Antonio, et al., "ICCI: In-Cache Coherence Information," IEEE Transactions on Computers, vol. PP, Issue 99, Citation Information: DOI10.1109/TC.2014.2308185, Feb. 2014, 14 pages.

List of IBM Patents of Patent Applications Treated as Related, Dec. 8, 2017, pp. 1-2.

* cited by examiner

US 10,572,385 B2

GRANTING EXCLUSIVE CACHE ACCESS USING LOCALITY CACHE COHERENCY STATE

This application is a continuation of co-pending U.S. patent application Ser. No. 14/518,428, filed Oct. 20, 2014, entitled "GRANTING EXCLUSIVE CACHE ACCESS USING LOCALITY CACHE COHERENCY STATE," which is hereby incorporated herein by reference in its entirety.

BACKGROUND

One or more aspects relate, in general, to improving system performance within a computing environment, and in particular, to managing cache coherency within the computing environment.

A typical enterprise server computer system comprises multiple processor sockets that may be interconnected together coherently in a variety of Symmetrical Multiple Processor (SMP) bus topologies so as to achieve the overall system capacity to meet the needs of the enterprise. The larger the SMP size in the server, the higher the coherent traffic is on the SMP buses and the greater the skew is on multiprocessor intervention latencies.

Due to physical constraints in how the processors can be interconnected, most common topologies involve grouping the processors into any number of nodes where the processors within a node have the fastest communication links to one another compared to processors in other nodes. Furthermore, the same constraints may drive partitioning of the total number of nodes into smaller SMP regions or groupings.

In cases where the SMP topology consists of many processor nodes and where the cache intervention times of remote nodes can exceed local memory access times, performance improvement can be achieved by assigning much of the memory and processors needed for a task to be physically closer than the rest of the system, i.e., assigning the task to an SMP region or grouping.

Even if one hundred percent localized affinity of memory and processors to an SMP region can be achieved, one or more operations that exist in certain coherent cache states still need to make a full address broadcast and coherency response round trip on the topology in order to be serviced.

SUMMARY

Shortcomings of the prior art are overcome and additional advantages are provided through the provision of a computer system for managing exclusive access to cache lines of a cache of a computing environment. The computer system includes a memory and a processor in communication with the memory, and the computer system is configured to perform a method. The method includes, for instance, requesting, by a node of the computing environment, exclusive access to a selected cache line of the cache. The computing environment includes a plurality of regions of nodes and the requesting includes sending a request for exclusive access to at least multiple regions of nodes of the plurality of regions of nodes, in which one region of nodes of the plurality of regions of nodes includes a plurality of nodes. The plurality of nodes include the node requesting exclusive access and another node of the computing environment, in which the node requesting exclusive access and the another node are local to one another as defined by a predetermined criteria. At least one node of the node requesting exclusive access and the another node includes a plurality of processors. The node requesting exclusive access checks a locality cache coherency state of the another node of the one region of nodes. The locality cache coherency state being on a per cache line basis to indicate whether a copy of the selected cache line is maintained outside of the plurality of nodes of the one region of nodes, the locality cache coherency state, based on being set to a defined value, indicating that no node outside of the one region of nodes has a copy of the selected cache line and that at least one node within the one region of nodes has access to the selected cache line. Based on the locality cache coherency state indicating that the another node has access to the selected cache line, determining that the node requesting exclusive access is to be granted exclusive access to the selected cache line. The determining being independent of transmission of information relating to the selected cache line from one or more other nodes of one or more other regions of nodes of the plurality of regions of nodes. Based on the locality cache coherency state indicating that the another node has access to the selected cache line, the determining ignores information, other than provided by the locality cache coherency state of the another node, of whether nodes outside of the one region of nodes have copies of the selected cache line.

Methods and program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a cache coherency management facility is provided to reduce latency in granting exclusive access to cached data (e.g., a cache line) in at least certain situations, such as shared read-only invalidations, thereby improving system performance.

One embodiment of a computing environment to incorporate and use one or more aspects of a cache coherency management facility is described with reference to FIG. 1A. In one example, the computing environment includes a Symmetrical Multiple Processor (SMP) system, which may be based on various architectures, including, but not limited to, Power 7 or the z/Architecture offered by International Business Machines Corporation, Armonk, N.Y. Aspects of the z/Architecture are described in an IBM Publication entitled "z/Architecture—Principles of Operation," Publication No. SA22-7832-09, 10$^{th}$ Edition, September 2012, which is hereby incorporated herein by reference in its entirety.

IBM and z/ARCHITECTURE, as well as POWER and POWERPC (referenced below) are registered trademarks of International Business Machines Corporation, Armonk, N.Y. Other names used herein may be registered trademarks, trademarks or product names of International Business Machines Corporation or other companies.

Figure 1A:
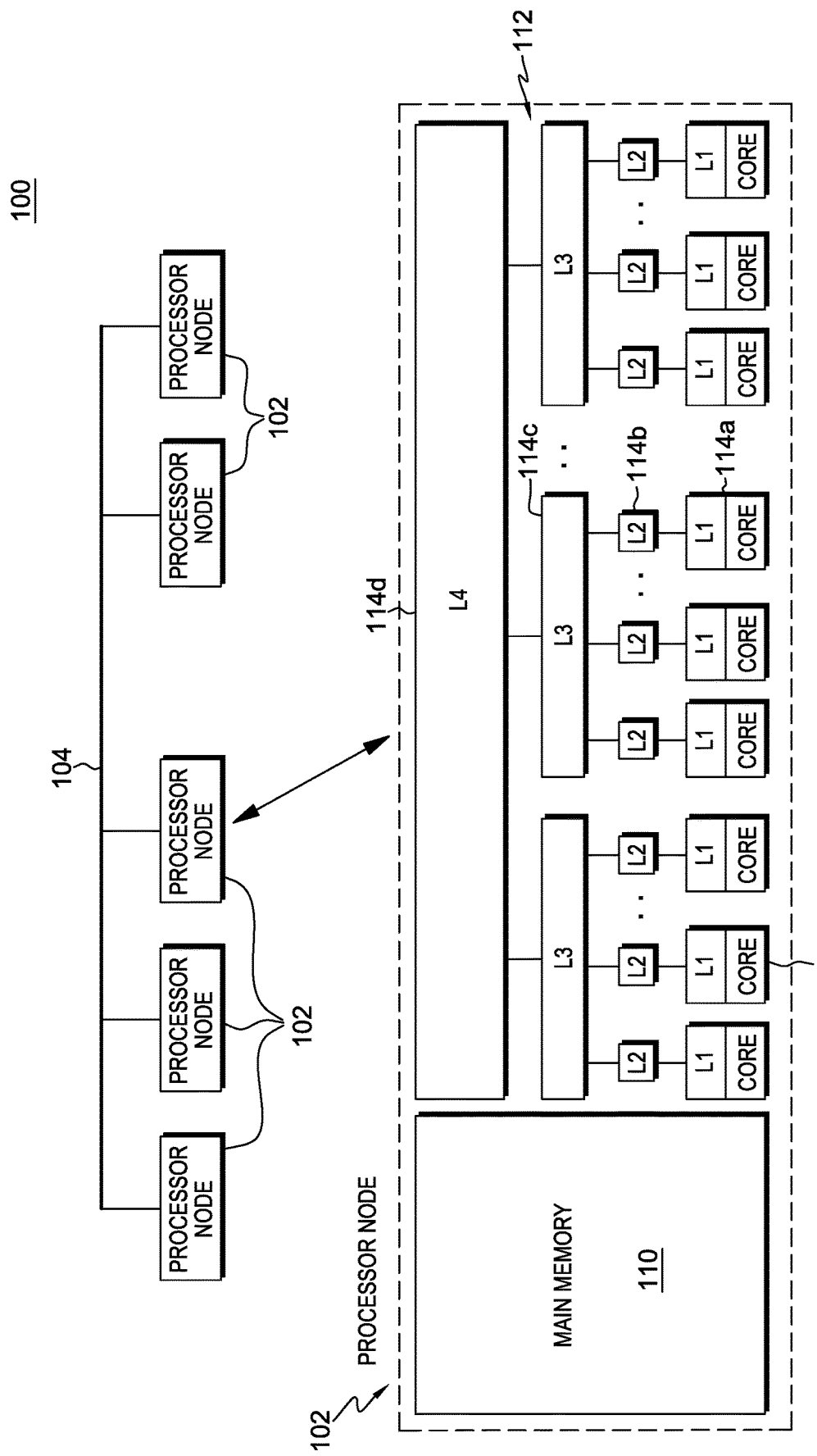
FIG. 1A depicts one embodiment of a Symmetrical Multiple Processor (SMP) system to incorporate and use one or more aspects of a cache coherency management facility.

Referring to FIG. 1A, in one example, an SMP system 100 includes a plurality of processor nodes 102 (also referred to herein as nodes) interconnected via one or more buses 104. In this particular example, a processor node 102 includes, for instance, main memory 110 coupled to a cache hierarchy 112 including a number of levels of cache, such as level 1 (L1) 114a, level 2 (L2) 114b, level 3 (L3) 114c, and level (L4) 114d, each of which is also referred to herein generally as cache 114. The L1 level caches are individual caches associated with particular processors 116 (also referred to herein as cores). Each node 102 includes one or more cores 116.

Figure 1B:
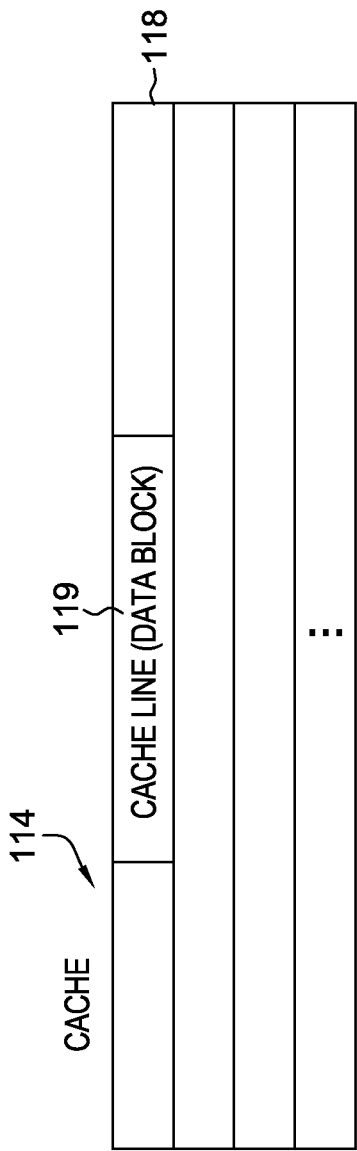
FIG. 1B depicts further details of a cache of the SMP system of FIG. 1A.

Regardless of level, each cache 114, as shown in FIG. 1B, may include one or more entries 118. Each entry 118 includes one or more fields, including, for instance, a cache line 119 (also referred to as a data block). The cache line includes the actual data fetched from main memory.

Figure 1C:
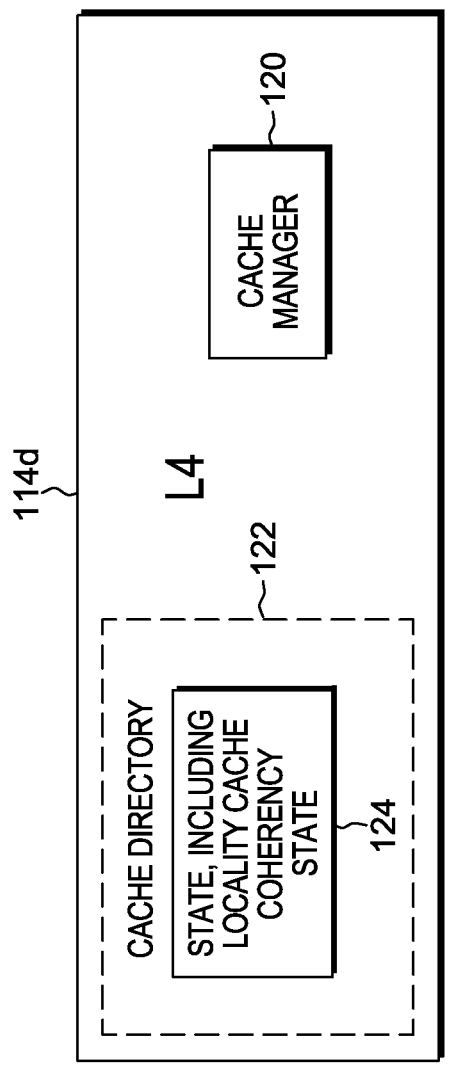
FIG. 1C depicts further details of one example of an L4 cache of the SMP system of FIG. 1A.

In one embodiment, the L4 cache is considered the highest level cache, as compared to the L1-L3 levels, and it is the cache used to perform management functions, in accordance with one or more aspects. As shown in FIG. 1C, in one example, the L4 cache includes a cache manager 120 and a cache directory 122. The cache directory includes various information associated with the different levels of cache, and also includes state information 124 for each cache line. In one example, this state information includes various states, such as, for instance:

IM—Intervention Master: If active, this copy of the cache line will be used to supply the data for fetches from another node. For any given cache line, the IM bit can be active on, e.g., only one node.

MC—Multi-copy: When active, this bit indicates that one or more additional copies of the line may exist on other nodes in the system.

EX—Exclusive: When set, this bit indicates that this node has acquired exclusive status and may update the associated cache line.

LOC—Locality Cache Coherency: When set to, e.g., one, this indicator (e.g., bit) indicates that no node outside of a local region, described below, has a copy of the cache line. Thus, if the MC bit is also on, another copy of the line may exist on another node, but only on a node that is within the local region. For instance, only a sibling node may have another copy, in one embodiment. Thus, the LOC indicates whether a node has access to a cache line exclusive of access by nodes outside of the local region.

In accordance with one or more aspects, use of the LOC state allows exclusivity to be granted to a node requesting access to the cache line at an earlier stage of invalidation, rather than waiting for responses from all the nodes that received the request, as described in further detail below.

Figure 2A:
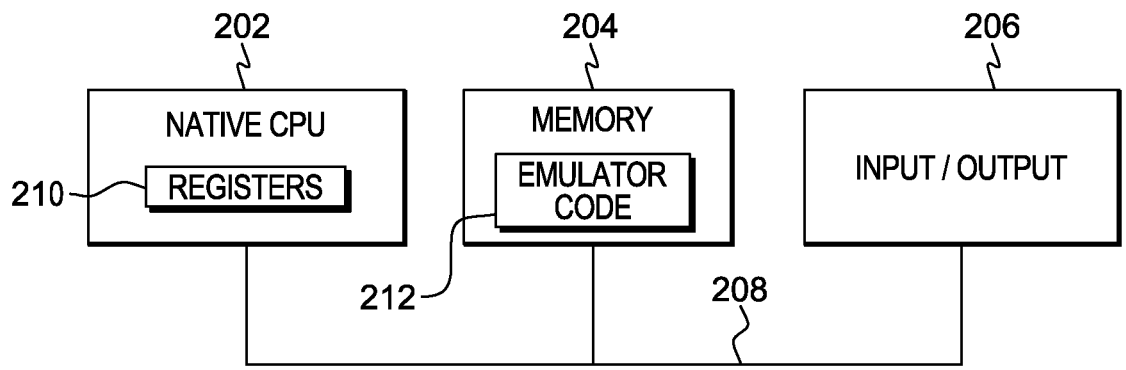
FIG. 2A depicts another embodiment of a computing environment to incorporate and use one or more aspects of a cache coherency management facility.

Another embodiment of a computing environment to incorporate and use one or more aspects of a cache coherency management facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment that include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture, or allows machines based on architectures other than the Power Architecture, such as HP Superdome Servers or others, to emulate the Power Architecture and to execute software and instructions developed based on the Power Architecture.

Figure 2B:
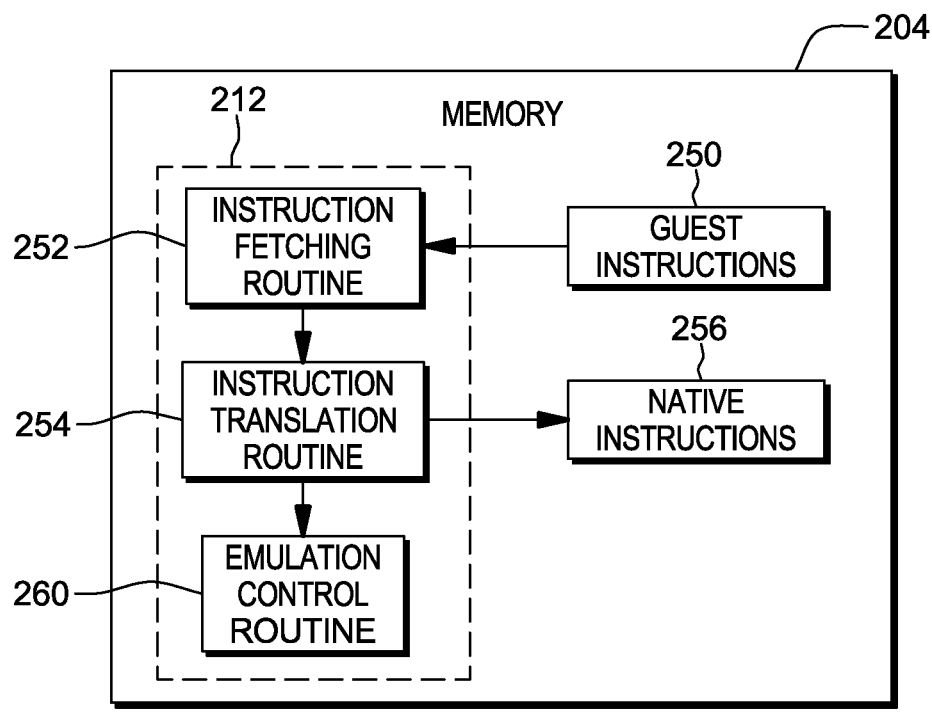
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture or Power processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function. In one embodiment, the guest instructions may include instructions or functions associated with the cache coherency management logic described herein.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The computing environments described above are only examples of computing environments that can be used. Other environments, including but not limited to, other multiprocessing environments, and/or other emulated environments, may be used; embodiments are not limited to any one environment or to any particular architecture or system.

Figure 3:
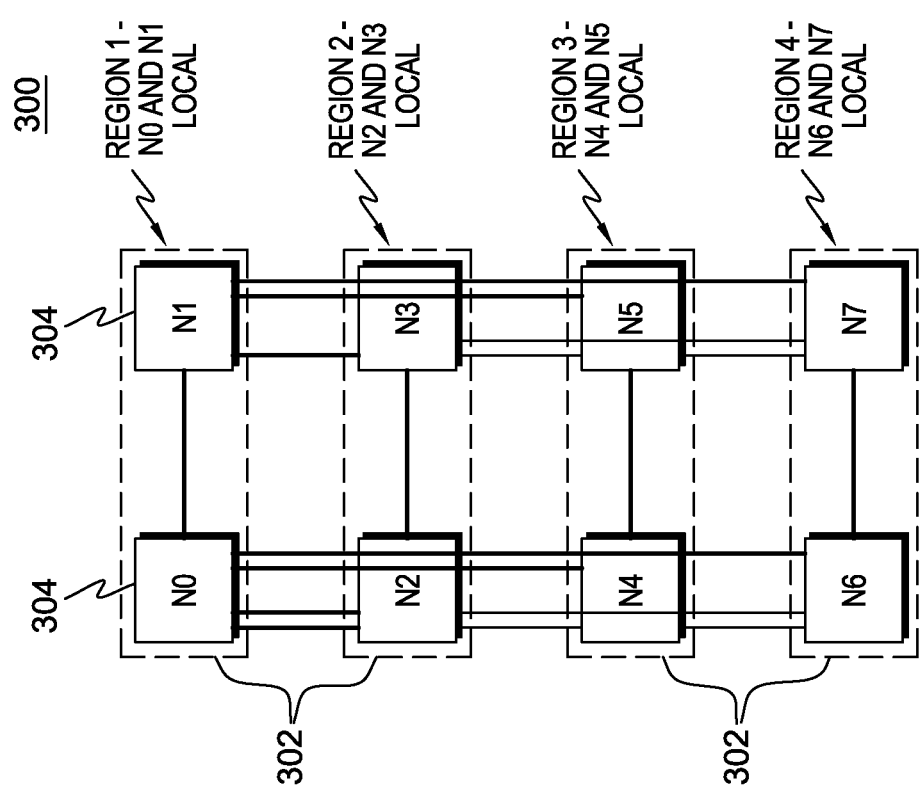
FIG. 3 depicts one example of a multi-node SMP system topology.

In accordance with one or more aspects, the nodes of an SMP system are grouped into regions or subsets of nodes, in which the nodes of a particular region are considered local nodes, and in particular, sibling nodes. For instance, as shown in FIG. 3, an eight node SMP system 300 is grouped into four regions 302. Each region includes a plurality of nodes 304 that are local to one another. In this particular example, each region includes a pair of nodes that are located in a same processor drawer; however, in other embodiments, the regions may include more than a pair of nodes. The nodes in a particular region are considered sibling nodes. For instance, node 0 (N0) and node 1 (N1) are local to one another and are sibling nodes. Similarly, node 2 (N2) and node 3 (N3) are local to one another and are sibling nodes; node 4 (N4) and node (N5) are local to one another and are sibling nodes; and node 6 (N6) and node 7 (N7) are local to one another and are sibling nodes. Further, the even numbered nodes (nodes 2, 4 and 6) are connected to one another and to node 0 and are considered proxy nodes to node 0. Further, nodes 3, 5 and 7 are connected to one another and to node 1 and are considered leaf nodes to node 0.

Although this example depicts eight nodes and four regions, an SMP system may have more or less nodes, and/or more or less regions. Further, each region may have more than a pair of nodes. Yet further, although in the examples described herein the nodes in a drawer are considered local to one another, other predetermined criteria (other than being in the same drawer) may be used to define being local to one another. Many variations are possible.

Figure 4A:
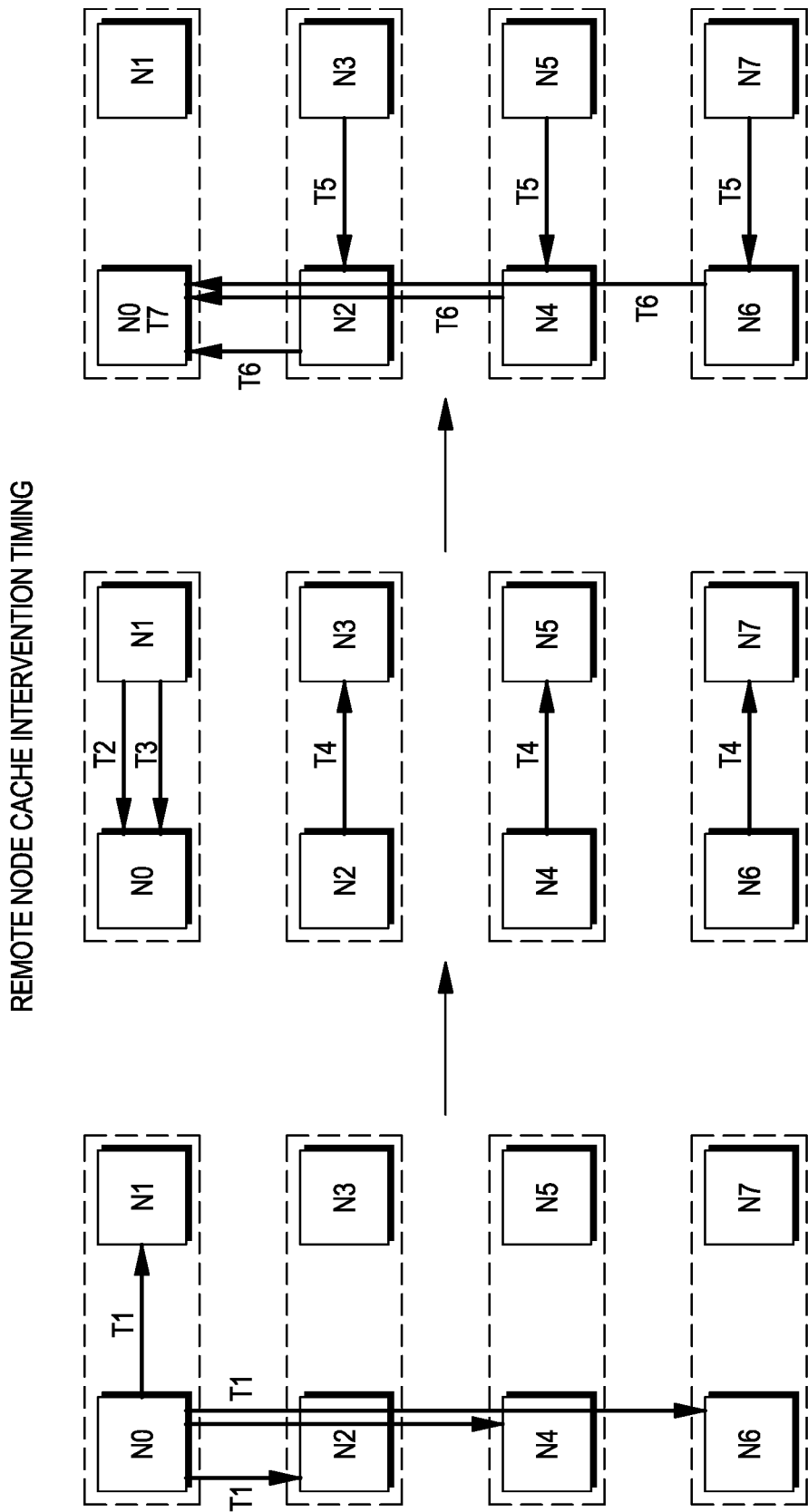
FIG. 4A depicts one example of timing associated with a remote node cache intervention.
Figure 4B:
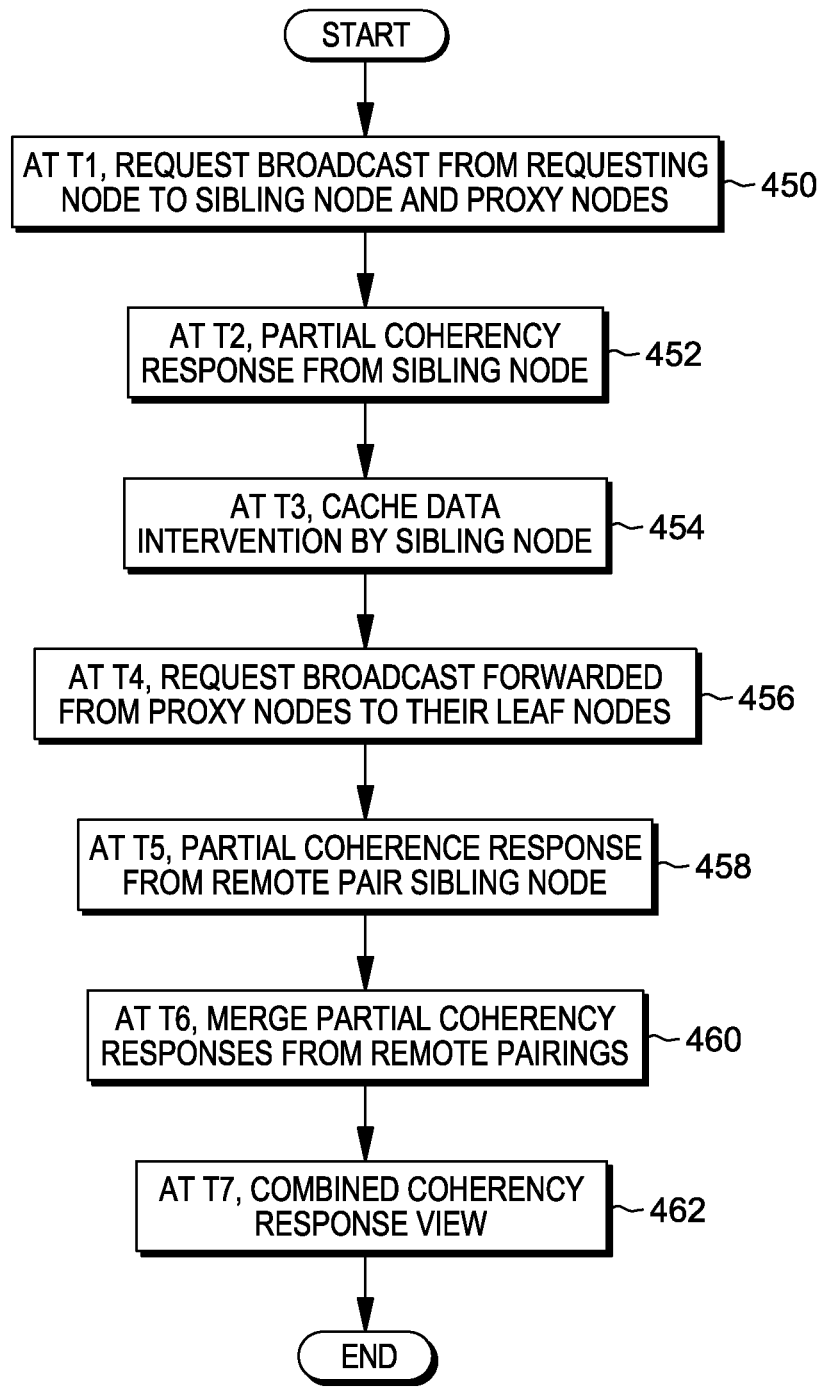
FIG. 4B depicts one embodiment of cache coherency logic for the topology of FIG. 4A.

One embodiment of communication between nodes of an SMP system is described with reference to FIGS. 4A-4B. Referring concurrently to FIGS. 4A-4B, one embodiment of a conventional remote node cache intervention is described. Initially referring to FIG. 4A, at a time T1, a request for a cache line is broadcast from a requesting node (e.g., N0) to its sibling node (e.g., N1), as well as to its proxy nodes (e.g., nodes N2, N4 and N6), STEP 450. The request includes, for instance, an address of a cache line for which N0 would like access, either shared or exclusive. In this example, it is assumed that N0 will receive the data from another node's cache, rather than from main memory.

At T2, a partial coherency response is received from sibling node N1, STEP 452. The response is considered partial since it is only from N1 and does not include responses from any other nodes. Further, at T3, in this example, cache data intervention is performed by sibling node N1, in which the requested cache line is provided to N0, STEP 454.

Although N0 has the requested data, processing of the request by the other nodes that received the broadcast continues. Thus, at T4, the request is broadcast forwarded from the proxy nodes to their leaf nodes, STEP 456.

Then, at T5, each proxy node of a remote pair receives a partial coherency response from its sibling node of the remote pair (a remote pair is a pair of nodes in, e.g., a region different from the requesting node), STEP 458. The partial coherency response for the remote pairings are merged at T6 (i.e., the responses from the proxy node and its sibling are merged), STEP 460, and at T7, a combined coherency response is viewed by node N0, STEP 462. At this point, exclusivity (permission to update) may be granted, since the requesting node has been informed that all other copies, if any, in the system have been invalidated.

A cache line may exist in multiple processor nodes in a shared read-only state. Then, when a processor decides to fetch a cache line with the intent to write, a system coherent operation, referred to, e.g., as a shared read-only invalidation, ensues. The fetch with intent to write request propagates up to the local node's last level cache where it begins the coherent operation to invalidate all existing copies of the shared line from its processors and remote nodes. The requesting node does not know exactly where copies of the shared line exist, so it broadcasts the address for the fetch with intent to write to every other node in the system.

For a strongly ordered system architecture, any storage updates are to be guaranteed to be performed on an exclusive copy of the data, i.e., the requesting node is to wait for confirmation that no copy of the data exists in any of the remote nodes. When the coherency responses from each of the remote nodes are received, then the requesting node may safely proceed with guaranteed exclusivity of the data to the processor that initiated the fetch with intent to write. This is further described with reference to FIGS. 5A-5B.

Figure 5A:
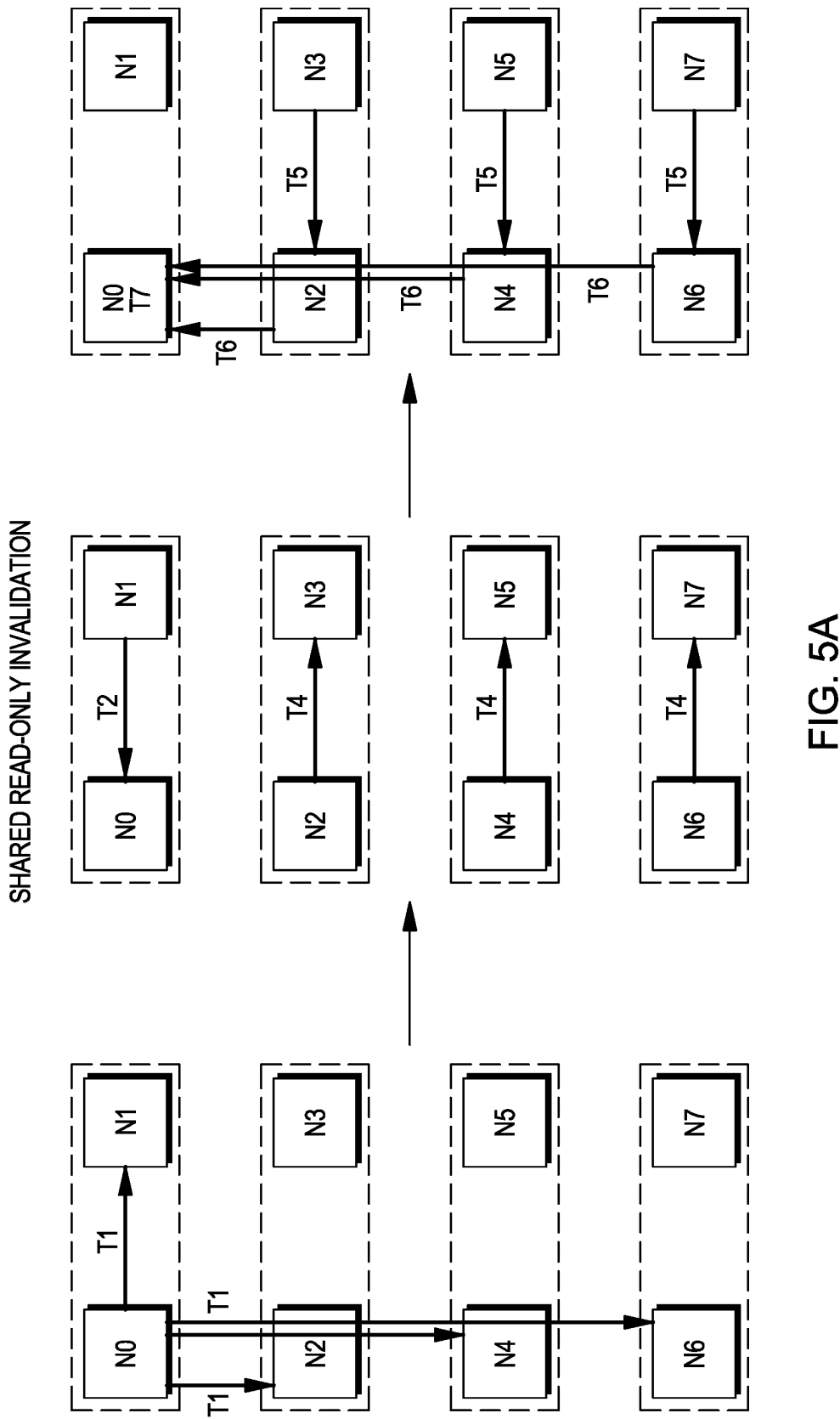
FIG. 5A depicts one embodiment of timing of a shared read-only invalidation.
Figure 5B:
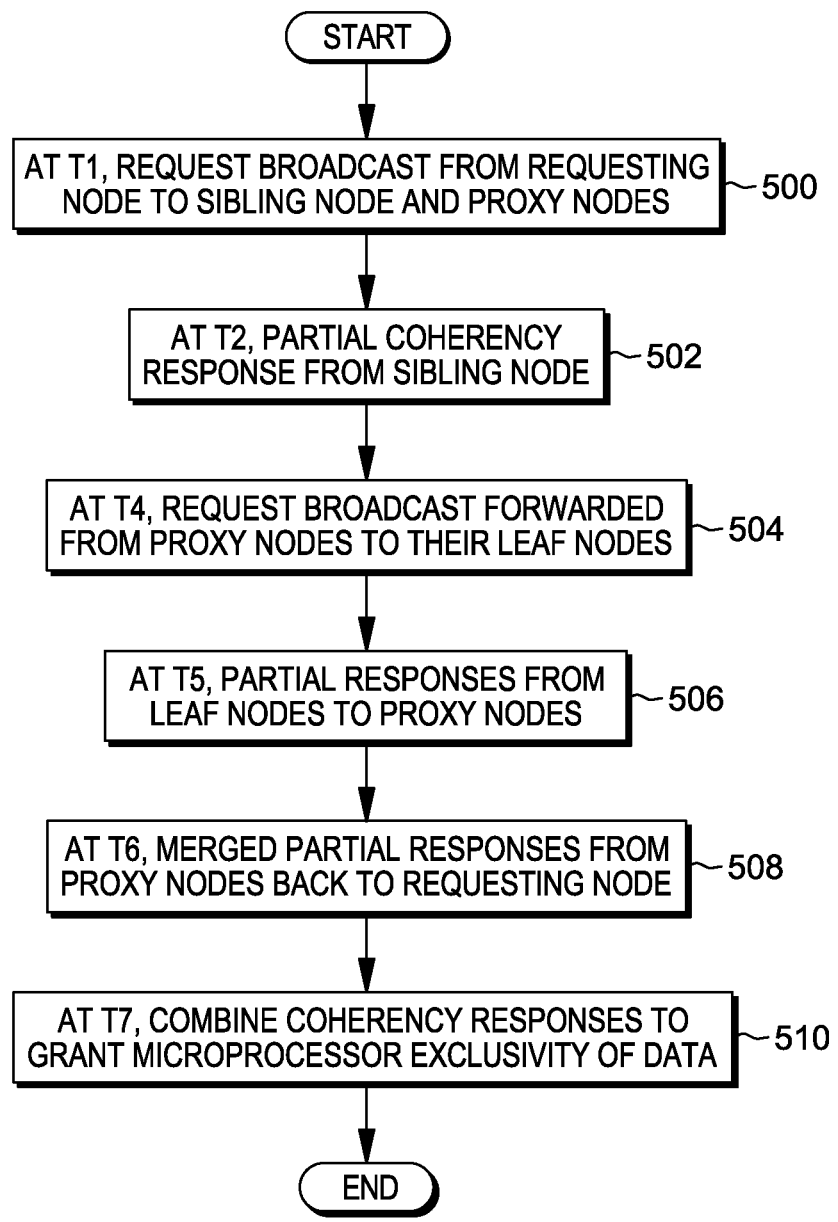
FIG. 5B depicts one embodiment of cache coherency logic for the topology of FIG. 5A.

Referring to FIGS. 5A-5B, one embodiment of a conventional shared read-only invalidation, in which coherency is established at T7 for a cache line requested by node N0, is described. At T1, a request with the address of the cache line for which exclusive access is requested is broadcast from requesting node N0 to sibling node N1 and to proxy nodes N2, N4 and N6, STEP 500. In one example, this request is included in an invalidation broadcast, since it is known that one or more nodes have shared read-only ownership of the cache line.

At T2, node N0 receives a partial coherency response from sibling node N1, STEP 502. This response is a partial response, since it is only from N1.

At T4, the request is broadcast forwarded from the proxy nodes to their leaf nodes, STEP 504, and at T5, partial responses are sent from the leaf nodes to the proxy nodes, STEP 506. Then, at T6, the partial responses from the leaf nodes are merged with the partial responses of their corresponding proxy nodes, and the merged responses are sent back to the requesting node N0, STEP 508. Further, at T7, a combined coherency response is provided to N0 granting exclusivity to N0 (e.g., to the processor in N0 requesting exclusivity), STEP 510. Thus, in this example, exclusivity is granted at T7 (i.e., after responses are received from all the nodes in the topology configured to receive the broadcast).

However, in accordance with one or more aspects, exclusivity may be granted at T3 rather than T7, as described with reference to FIGS. 6A and 6B. That is, exclusivity may be granted after receiving a response from the requesting node's sibling node(s) rather than waiting for the responses from the other nodes. In particular, with reference to FIGS. 6A-6B, one embodiment of shared read-only invalidation, in accordance with one or more aspects, is described.

In this example, the states of the nodes are initially, as follows:
N0: IM=OFF, MC=ON, EX=OFF, LOC=OFF—This state shows the line does exist on N0 at the start of the operation, but other copies may exist elsewhere.
N1: IM=ON, MC=ON, EX=OFF, LOC=ON—This state shows that N1 is the intervention master, and the only place where another copy of the line can exist is N0, this fact is communicated to N0.
All other nodes: Invalid: No valid entry exists for the line in the directory on these nodes.

Figure 6A:
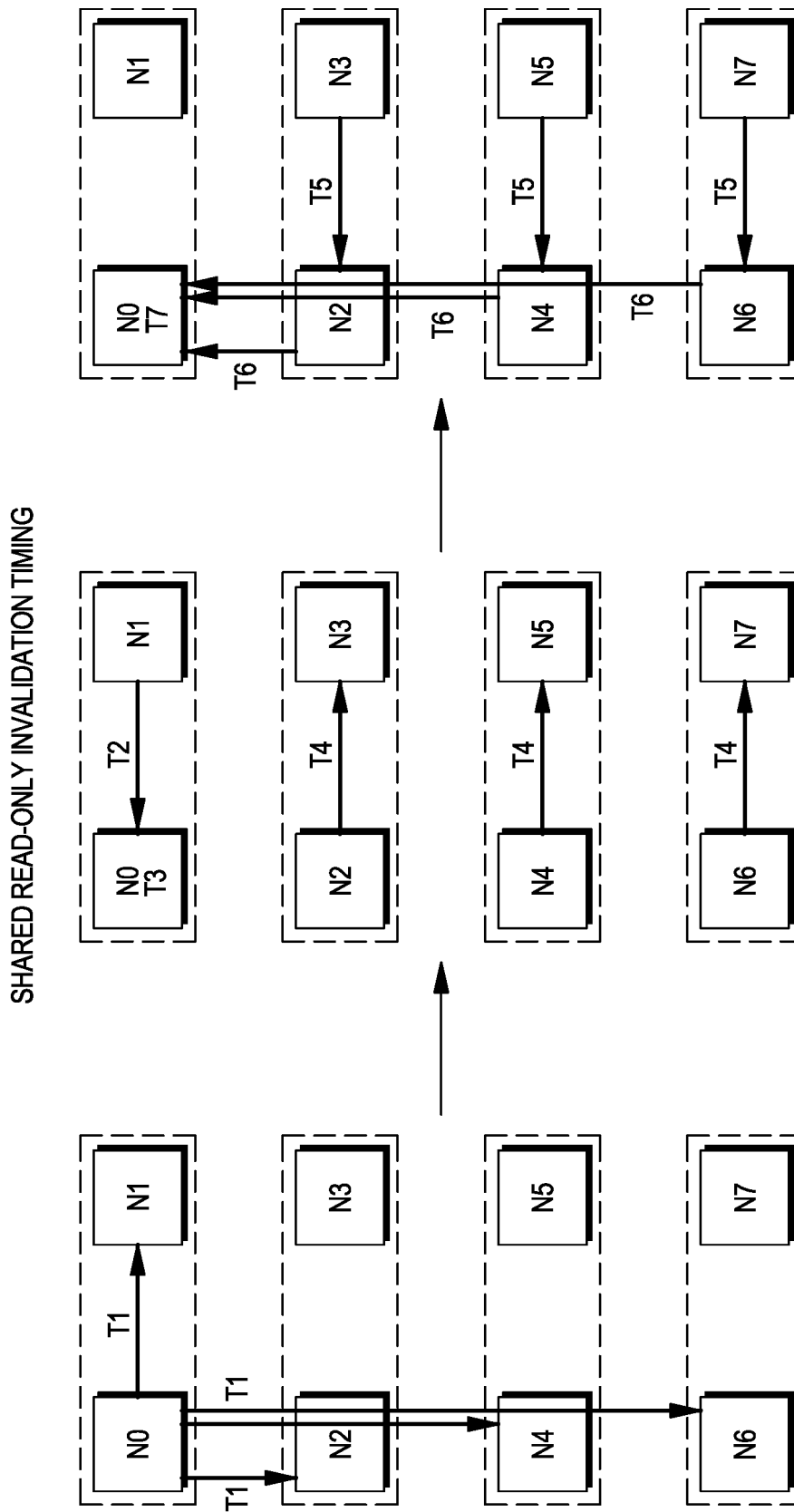
FIG. 6A depicts another embodiment of timing for a shared read-only invalidation, in accordance with one or more aspects.
Figure 6B:
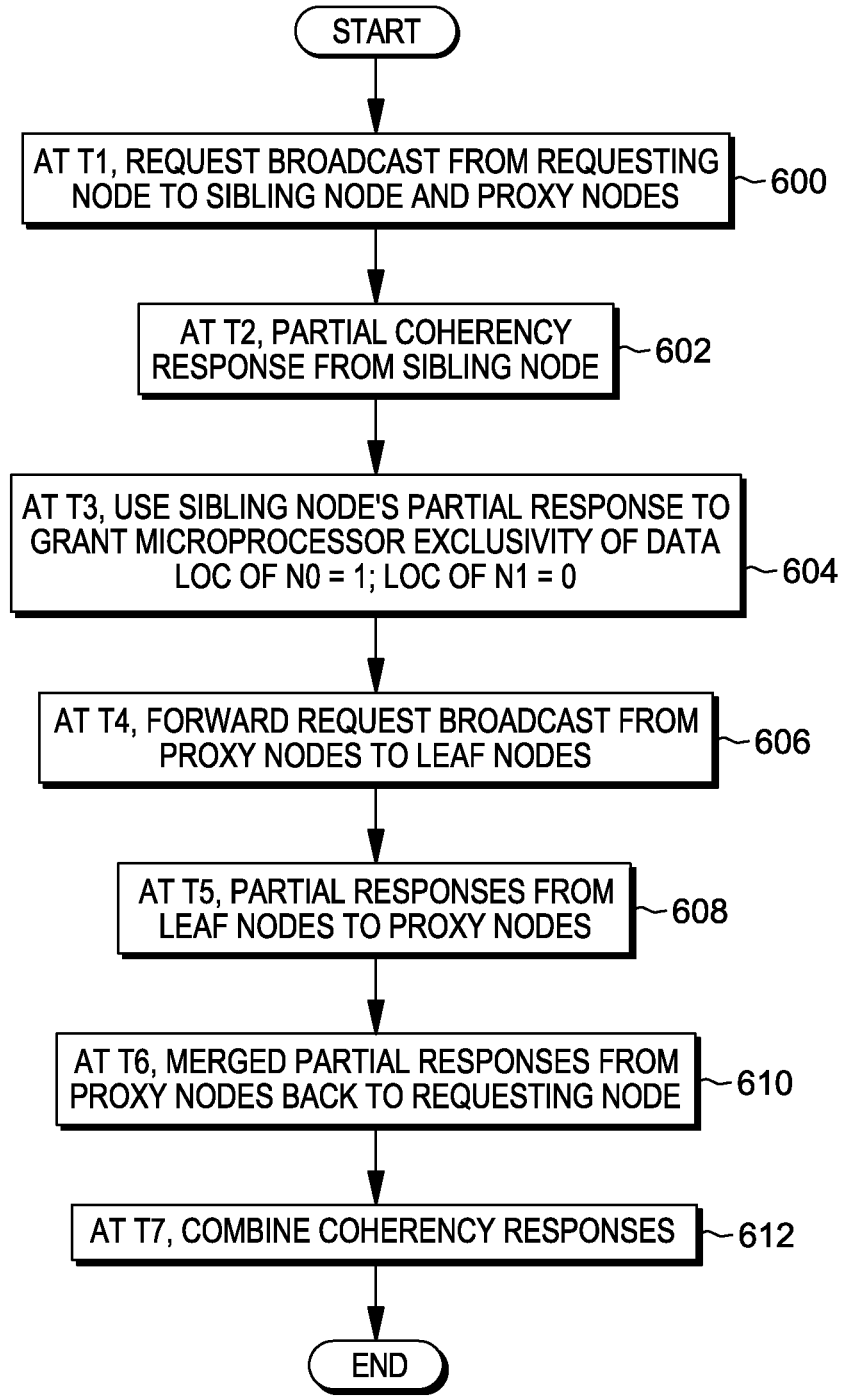
FIG. 6B depicts one embodiment of cache coherency logic for the topology of FIG. 6A.

Referring to FIGS. 6A-6B, at T1, a request is broadcast from the requesting node N0 to sibling node N1 and to proxy nodes N2, N4 and N6, STEP 600. The request includes, for instance, an address of a cache line for which N0 is requesting exclusive access. At T2, N0 receives a partial coherency response from sibling node N1, STEP 602. The partial coherency response is a response from N1 that includes, for instance, the locality cache coherency state of N1. If the locality cache coherency state of N1 is set (e.g., to one or another value indicating set), then the coherency rules for setting this state indicate that N1 has the only copy of this cache line. Thus, at T3, the partial response from N1 is used to grant exclusivity of the data of the cache line to N0, STEP 604. N0 is granted exclusive access to the data and it sets its locality cache coherency state (e.g., LOC=1). Further, N1 invalidates its copy of the cache line and, in one embodiment, resets (e.g., set to zero) its locality cache coherency state. In another embodiment, the LOC for N1=invalid, since no valid entry exists for the cache line in the directory for N1.

Although exclusivity is granted at T3, in one embodiment, the topology continues to broadcast the request as in conventional systems. For example, at T4, the request is broadcast forwarded from the proxy nodes to the leaf nodes, STEP 606, and at T5, partial responses from the leaf nodes are provided to the proxy nodes, STEP 608. The partial responses from the leaf nodes are merged with the partial responses of the proxy nodes, and the merged responses are sent back to the requesting node at T6, STEP 610. At T7, the requesting node has a combined coherency response, STEP 612; however, N0 was granted exclusive access at T3.

As one example, the final state of the nodes is as follows:
N0: IM=ON, MC=OFF, EX=ON, LOC=ON—This state shows that N0 has acquired exclusivity for the line. No data transfer was needed.
N1 and all other nodes: Invalid, no valid entry exists for the line in the directory on these nodes.

Described in detail herein is a technique for tracking when a cache line exists within a local node region (e.g., a pairing) so it can be determined whether exclusivity is to be granted at an earlier time than conventionally for, e.g., shared read-only invalidation cases. In one embodiment, exclusivity can be granted in T3 (at a time when a response to a request is received from sibling node(s) of the requesting node), when the cache line exists only in the local node pair, as determined by a locality cache coherency state of the sibling node in the local node pair. Further, exclusivity is granted in T7 (at a time when responses to a request are received from all nodes), when the cache line may exist in one or more remote node pairs.

A locality cache coherency state is provided to aid in tracking when a cache line has migrated in and out of the local processor affinity grouping, which in this example is the node pair on the same drawer. Each level cache in the system has this locality cache coherency state as that is where system coherency management is performed. Associated with the locality cache coherency state are certain rules to set the state, as well as to reset the state. When the locality cache coherency state is set, it implies that none of the remote node pairs have a cached copy of the data of the requested cache line. It is set (e.g., set to one, or other indication of being set) in the following situations: data is sourced from memory because the address misses in all other nodes in the system; data is installed in exclusive ownership state regardless of where data is sourced from; data is installed in shared read-only state when it is sourced from a sibling node.

When the locality cache coherency state is reset (e.g., set to 0), it implies that the copy of the data exists in one or more remote pairs. It is reset based on, for instance, invalidation of the cache line due to an exclusivity request of data by another node, and/or a read-only request from a node outside of the local node pair regardless of data source.

From these two sets of rules, it can be inferred that the locality cache coherency state value for a given cache line has meaning when the line exists in the cache. Otherwise, it is invalid. Further, the locality for any given cache line exists in one and only one node pair, in this example.

Various examples of locality state transitioning are provided below. Each step assumes the state of a previous step, if any. In the examples below, LOC is the locality cache coherency state and inv=invalid.
Step 1—Node 0 gets cache miss responses from all nodes, gets data from memory
Node 0 Loc=1, Node 1 Loc=inv (Node 1 does not have the cache line, since Node 0 obtained it from memory, so LOC=invalid.)

Step 2—Node 1 requests a read-only copy of same data, gets data from Node 0
  Node 0 Loc=1, Node 1 Loc=1
Step 3—Node 0 broadcasts a shared invalidation to all nodes in system.
  Exclusivity is granted in T3
  Node 0 Loc=1, Node 1 Loc=inv (Node 1 invalidates its copy)
Step 4—Node 3 requests a read-only copy of data, gets data from Node 0
  Node 0 Loc=0, Node 1 Loc=inv, Node 3 Loc=0 (Since Node 3 is remote from Nodes 0 and 1, no locality since data is shared by remote nodes)
Step 5—Node 1 requests a read-only copy of data, gets data from Node 3
  Node 0 Loc=0, Node 1 Loc=0, Node 3 Loc=0
Step 6—Node 0 broadcasts a shared invalidation to all nodes in system.
  Exclusivity is granted in T7—LOC not set, so need to wait for responses from all remote nodes
  Node 0 Loc=1, Node 1 Loc=inv, Node 3 Loc=inv
Step 7—Node 3 requests exclusivity of data, gets data from Node 0
  Node 0 Loc=inv, Node 1 Loc=inv, Node 3 Loc=1
Step 8—Node 0 requests a read-only copy of data, gets data from Node 3
  Node 0 Loc=0, Node 1 Loc=inv, Node 3 Loc=0
Step 9—Node 1 requests a read-only copy of data, gets data from Node 0
  Node 0 Loc=0, Node 1 Loc=0, Node 3 Loc=0

A locality cache coherency state is provided to track ownership of a cache line as it moves around the different SMP regions in a larger system. The locality cache coherency state conveys to a requestor the ability to grant exclusivity after receiving a coherency response from a sibling or nearby node that includes a set locality cache coherency state (i.e., a shared copy exists in the sibling or nearby node), but without waiting for coherency responses from all the other remote nodes (since the other nodes will not have such a copy). The technique works with or without processor affinity groups, hence, it is not dependent on the assistance from a hypervisor or operating system to produce the desirable performance value. Management of the locality cache coherency state is performed through recognition of the type of data request (e.g., fetch with the intent to write) and origin of the request across the processing nodes in the system.

The locality cache coherency state is added, as examples, to the last level cache hierarchy in the form of an additional bit in the directory ownership tag field or a new code point in the directory ownership tag field. The logic to manage the new locality state is minimal. This state speeds up servicing of certain fetch request types without waiting for system coherency responses to the request from all the remote nodes; thus, improving system performance.

Figure 7:
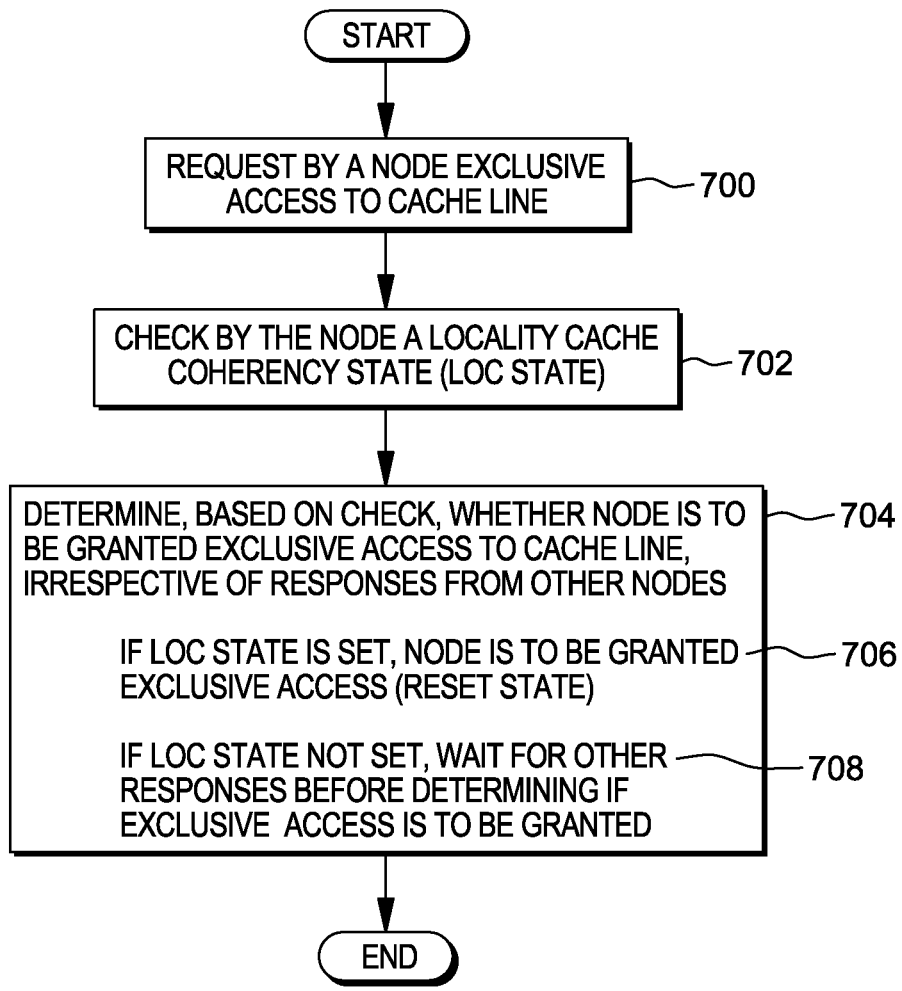
FIG. 7 depicts one embodiment of logic to grant exclusive access based on locality cache coherency state of a local node.

In one embodiment, as described with reference to FIG. 7, a node (e.g., N0) requests exclusive access to a cache line of a cache, STEP 700. The requesting node (N0) is in one region of nodes of a plurality of regions of nodes. The one region of nodes includes the requesting node and another node (N1), in which the requesting node and the another node are local to one another as defined by a predetermined criteria (e.g., in the same processor drawer). The requesting node obtains a locality cache coherency state of the another node and checks the state, STEP 702. The locality cache coherency state is specific to the another node and indicates whether the another node has access to the cache line. Based on the checking indicating the another node has access to the cache line, it is determined that the requesting node is to be granted exclusive access to the cache line, STEP 704. For instance, if the locality cache coherency state of the another node is set, N0 is granted exclusive access, the locality cache coherency state of N0 is set, the cache line is invalidated in N1, and the locality cache coherency state of N1 is reset, STEP 706. However, if the locality cache coherency state of the another node is not set, then N0 waits for responses from the other nodes before being granted exclusive access, STEP 708.

The determining that exclusive access is to be granted based on the locality cache coherency state of the sibling node being set is independent of transmission of information relating to the cache line from one or more other nodes of one or more other regions of nodes (i.e., the remote nodes). As used herein, independent of the transmission of information relating to the cache line means that the determining ignores information that was, for instance, sent from the other nodes and received by N0, information that was sent from the other nodes and not received by N0, and even information that was not sent from the other nodes at all (i.e., it disregards the other nodes). The information may include coherency responses from the other nodes of the topology (i.e., the nodes other than the sibling node(s) configured to receive the broadcast). The information (e.g., the coherency responses) of the remote nodes is ignored; i.e., exclusive access to the cache line is granted to N0 without waiting for the responses from the remote nodes and based exclusively on the setting of the locality cache coherency state of the sibling node(s).

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

Figure 8:
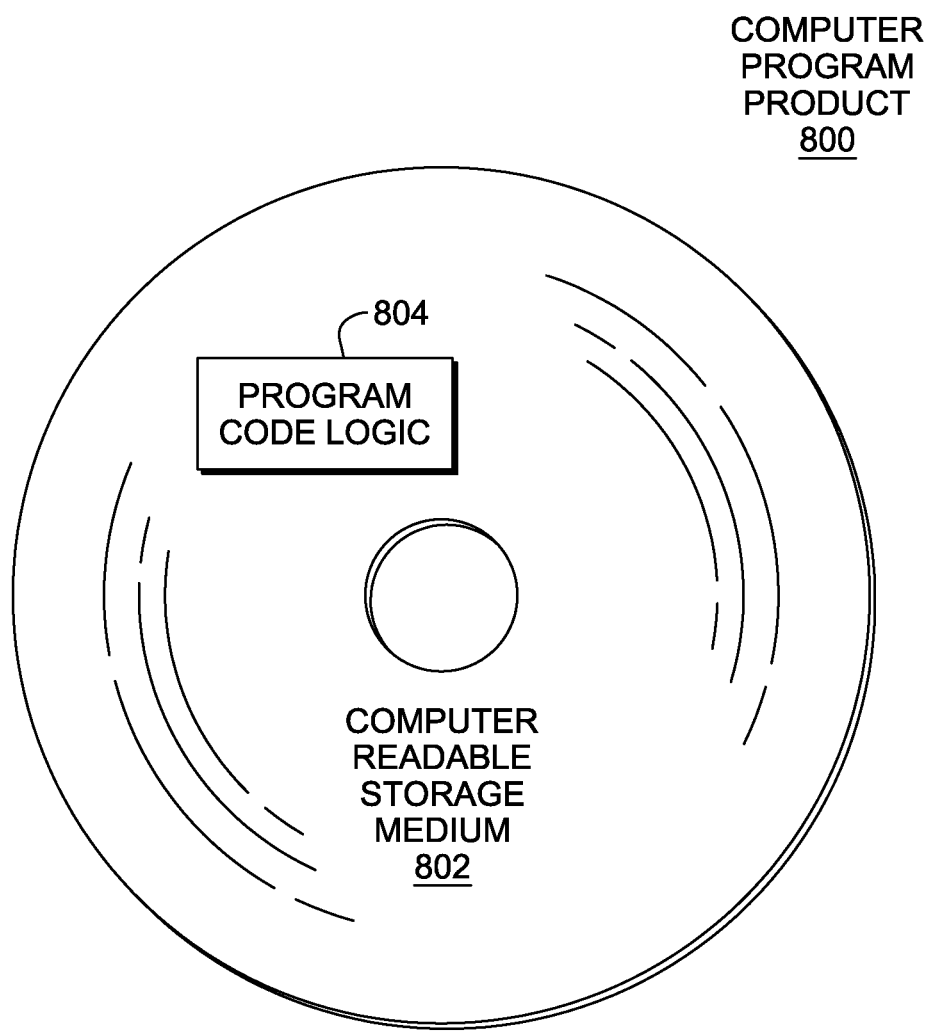
FIG. 8 depicts one embodiment of a computer program product incorporating one or more aspects.

Referring to FIG. 8, in one example, a computer program product 800 includes, for instance, one or more non-transitory computer readable storage media 802 to store computer readable program code means, logic and/or instructions 804 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, the locality cache coherency state may be indicated in other ways. Additionally, regions may be defined differently and include more than just one sibling node. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
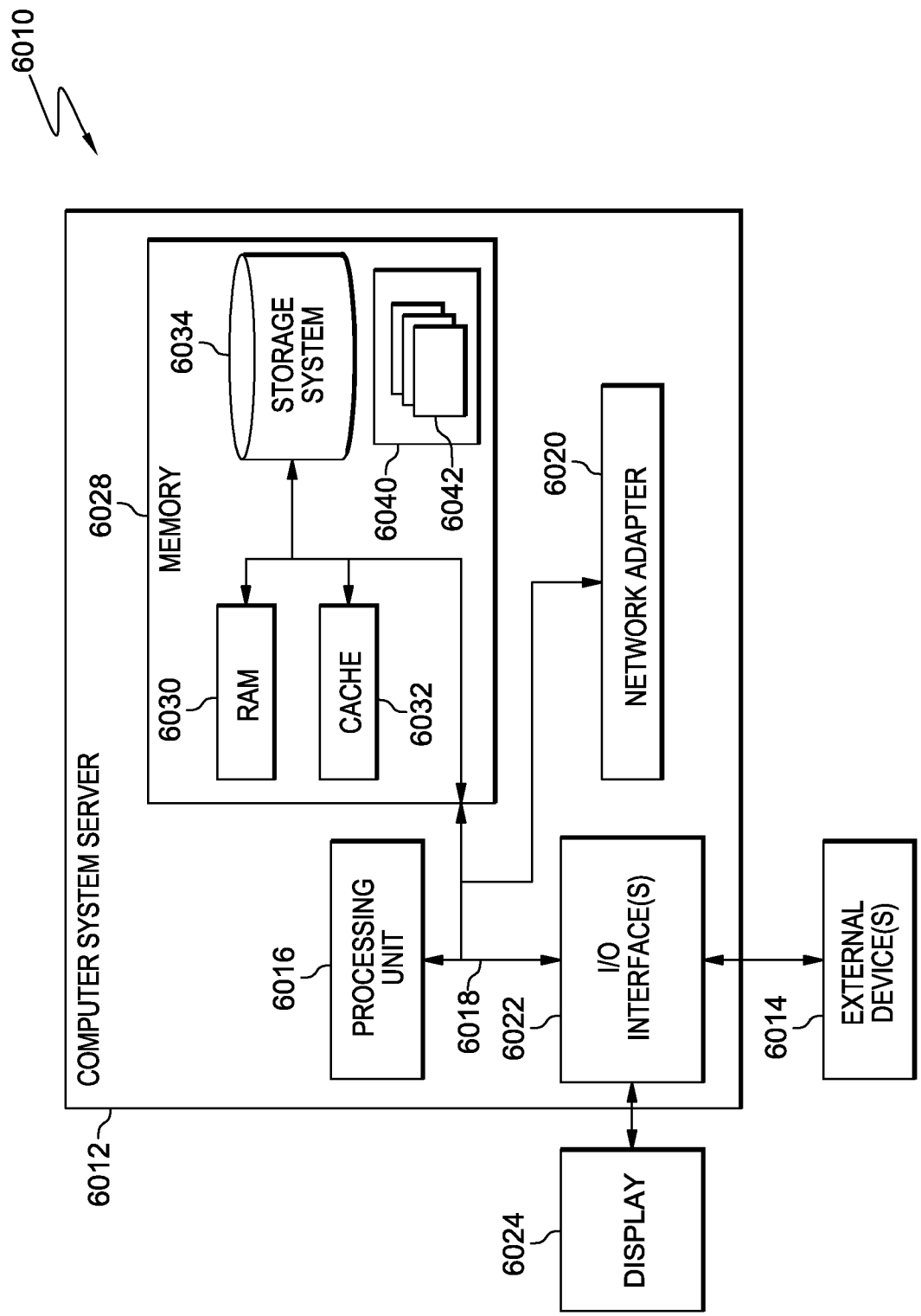
FIG. 9 depicts one embodiment of a cloud computing node.

Referring now to FIG. 9, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 10:
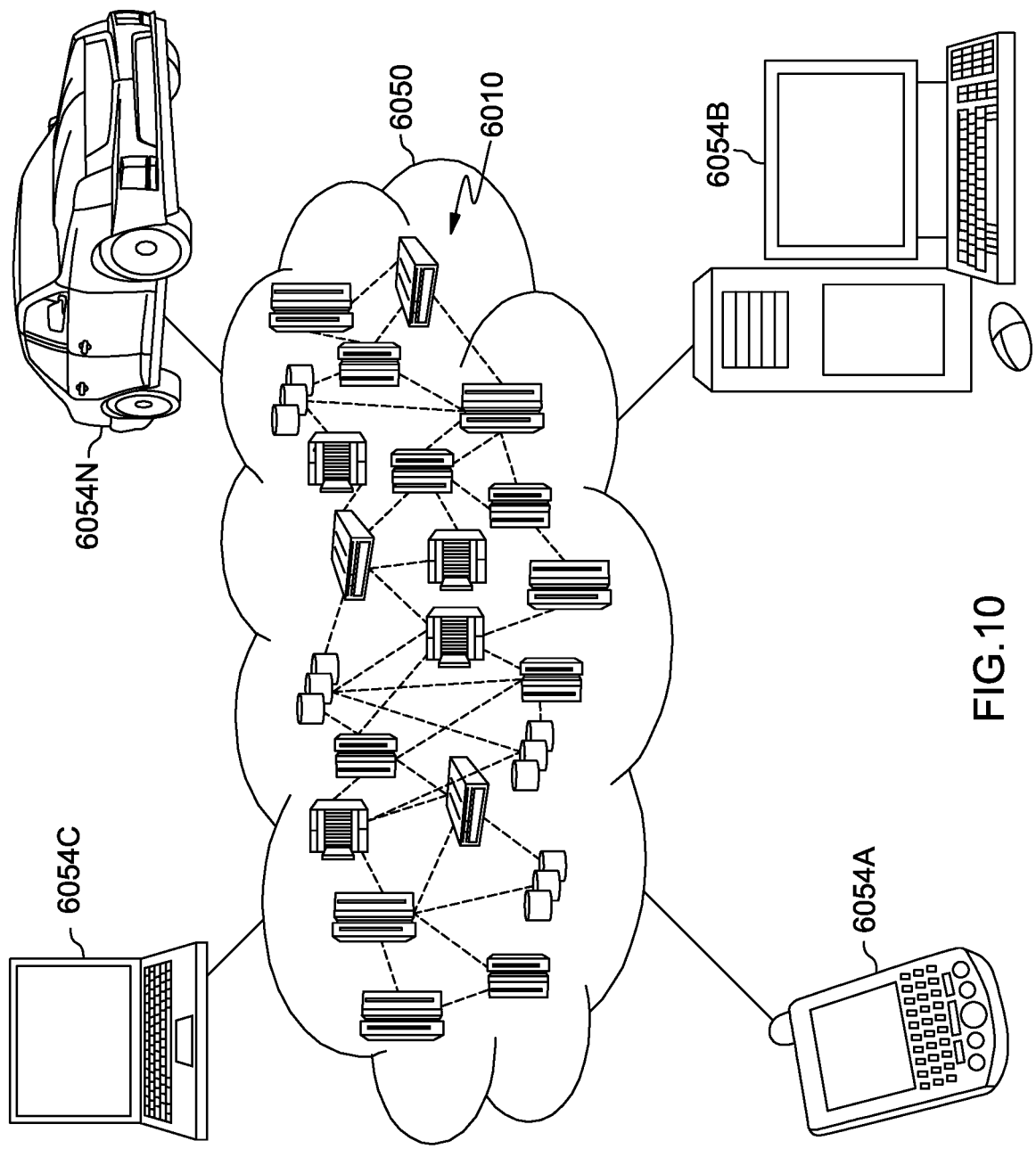
FIG. 10 depicts one embodiment of a cloud computing environment.

Referring now to FIG. 10, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 10 are intended to be illustrative only and that computing nodes 6010 and cloud computing environment 6050 can communicate with any type of computerized device over any type of network and/or network addressable connection (e.g., using a web browser).

Figure 11:
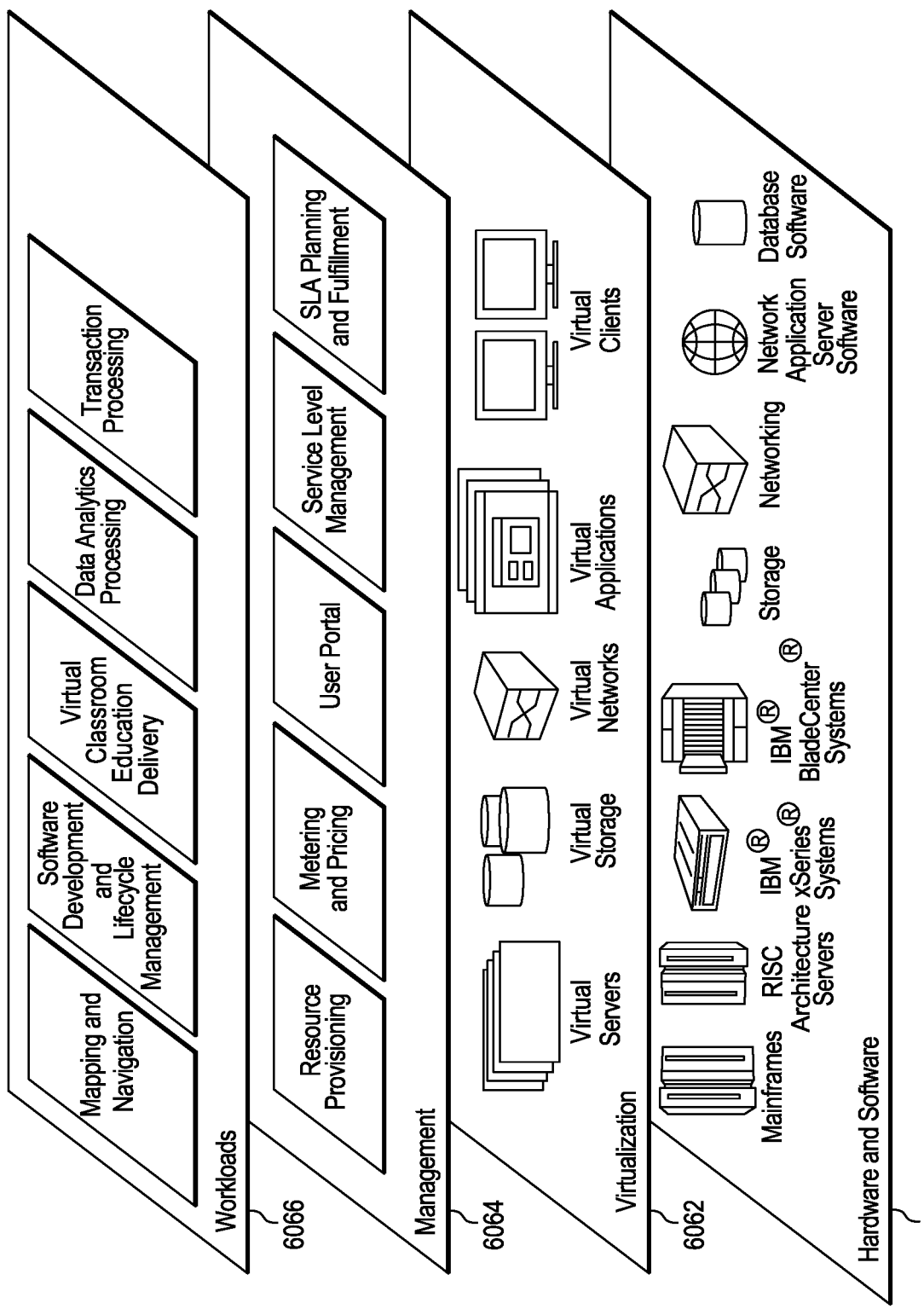
FIG. 11 depicts one example of abstraction model layers.

Referring now to FIG. 11, a set of functional abstraction layers provided by cloud computing environment 6050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system for managing exclusive access to cache lines of a cache of a computing environment, said computer system comprising:

a memory; and a processor in communication with the memory, wherein the computer system is configured to perform a method, said method comprising:

requesting, by a node of the computing environment, exclusive access to a selected cache line of the cache, the computing environment including a plurality of regions of nodes and the requesting comprising sending a request for exclusive access to at least multiple regions of nodes of the plurality of regions of nodes, wherein one region of nodes of the plurality of regions of nodes includes a plurality of nodes, the plurality of nodes comprising the node requesting exclusive access and another node of the computing environment, wherein the node requesting exclusive access and the another node are local to one another as defined by a predetermined criteria, and wherein at least one node of the node requesting exclusive access and the another node includes a plurality of processors; and facilitating, based on the requesting of exclusive access, shared read-only invalidating for the selected cache line of the cache, where the selected cache line is capable of existing in a shared read-only state in multiple nodes of the computing environment, the facilitating including:

checking, by the node requesting exclusive access, a locality cache coherency state of the another node of the one region of nodes, the locality cache coherency state being on a per cache line basis to indicate whether a copy of the selected cache line is maintained outside of the plurality of nodes of the one region of nodes, the locality cache coherency state, based on being set to a defined value, indicating that no node outside of the one region of nodes has a copy of the selected cache line and that at least one node within the one region of nodes has access to the selected cache line; and determining, based on the locality cache coherency state indicating that the another node has access to the selected cache line, that the node requesting exclusive access is to be granted exclusive access to the selected cache line, the determining being independent of transmission of information relating to the selected cache line from one or more other nodes of one or more other regions of nodes of the plurality of regions of nodes, and wherein, based on the locality cache coherency state indicating that the another node has access to the selected cache line, the determining ignores information, other than provided by the locality cache coherency state of the another node, of whether nodes outside of the one region of nodes have copies of the selected cache line.

2. The computer system of claim 1, wherein the requesting includes sending the request to the another node and to the one or more other nodes of the one or more other regions of nodes, and wherein the determining being independent of transmission of information relating to the selected cache line comprises the determining being independent of responses to the request from the one or more other nodes.

3. The computer system of claim 1, wherein the predetermined criteria comprises being located within a same drawer of the computing environment, wherein the node requesting exclusive access and the another node are located within the same drawer and are local to one another.

4. The computer system of claim 1, wherein the checking comprises obtaining from the another node, in reply to the request for exclusive access, the locality cache coherency state in a response from the another node.

5. The computer system of claim 1, wherein the checking comprises checking that the locality cache coherency state is set, and wherein based on the locality cache coherency state being set, the determining indicates that the node requesting exclusive access is to be granted exclusive access.

6. The computer system of claim 1, wherein the locality cache coherency state being set indicates that the one or more other nodes do not have a cached copy of data of the selected cache line.

7. The computer system of claim 1, wherein the locality cache coherency state being set indicates the another node has access to the selected cache line, and wherein the locality cache coherency state is set based on the another node requesting the selected cache line and one of:
 data of the selected cache line being obtained from memory;
 the another node obtains exclusive ownership of the selected cache line; or
 the another node obtains shared read-only ownership of the selected cache line based on the data of the selected cache line being obtained from a sibling node.

8. The computer system of claim 1, wherein the locality cache coherency state is reset based on the request for exclusive access.

9. The computer system of claim 1, wherein the locality cache coherency state is located within a cache of the another node.

10. The computer system of claim 1, wherein the determining is based exclusively on the locality cache coherency state of the another node, wherein information relating to the selected cache line from the one or more other nodes, if any, is ignored.

11. A computer program product for managing exclusive access to cache lines of a cache of a computing environment, said computer program product comprising:
 a computer readable storage medium readable by a processing circuit and storing instructions for performing a method comprising:
  requesting, by a node of the computing environment, exclusive access to a selected cache line of the cache, the computing environment including a plurality of regions of nodes and the requesting comprising sending a request for exclusive access to at least multiple regions of nodes of the plurality of regions of nodes, wherein one region of nodes of the plurality of regions of nodes includes a plurality of nodes, the plurality of nodes comprising the node requesting exclusive access and another node of the computing environment, wherein the node requesting exclusive access and the another node are local to one another as defined by a predetermined criteria, and wherein at least one node of the node requesting exclusive access and the another node includes a plurality of processors; and
  facilitating, based on the requesting of exclusive access, shared read-only invalidating for the selected cache line of the cache, where the selected cache line is capable of existing in a shared read-only state in multiple nodes of the computing environment, the facilitating including:
   checking, by the node requesting exclusive access, a locality cache coherency state of the another node of the one region of nodes, the locality cache coherency state being on a per cache line basis to indicate whether a copy of the selected cache line is maintained outside of the plurality of nodes of the one region of nodes, the locality cache coherency state, based on being set to a defined value, indicating that no node outside of the one region of nodes has a copy of the selected cache line and that at least one node within the one region of nodes has access to the selected cache line; and
   determining, based on the locality cache coherency state indicating that the another node has access to the selected cache line, that the node requesting exclusive access is to be granted exclusive access to the selected cache line, the determining being independent of transmission of information relating to the selected cache line from one or more other nodes of one or more other regions of nodes of the plurality of regions of nodes, and wherein, based on the locality cache coherency state indicating that the another node has access to the selected cache line, the determining ignores information, other than provided by the locality cache coherency state of the another node, of whether nodes outside of the one region of nodes have copies of the selected cache line.

12. The computer program product of claim 11, wherein the requesting includes sending the request to the another node and to the one or more other nodes of the one or more other regions of nodes, and wherein the determining being independent of transmission of information relating to the selected cache line comprises the determining being independent of responses to the request from the one or more other nodes.

13. The computer program product of claim 11, wherein the checking comprises checking that the locality cache coherency state is set, and wherein based on the locality cache coherency state being set, the determining indicates that the node requesting exclusive access is to be granted exclusive access.

14. The computer program product of claim 11, wherein the locality cache coherency state being set indicates that the one or more other nodes do not have a cached copy of data of the selected cache line.

15. The computer program product of claim 11, wherein the locality cache coherency state being set indicates the another node has access to the selected cache line, and wherein the locality cache coherency state is set based on the another node requesting the selected cache line and one of:
 data of the selected cache line being obtained from memory;
 the another node obtains exclusive ownership of the selected cache line; or the another node obtains shared read-only ownership of the selected cache line based on the data of the selected cache line being obtained from a sibling node.

16. The computer program product of claim 11, wherein the locality cache coherency state is reset based on the request for exclusive access.

17. The computer program product of claim 11, wherein the determining is based exclusively on the locality cache coherency state of the another node, wherein information relating to the selected cache line from the one or more other nodes, if any, is ignored.

18. A computer-implemented method of managing exclusive access to cache lines of a cache of a computing environment, said computer-implemented method comprising:
   requesting, by a node of the computing environment, exclusive access to a selected cache line of the cache, the computing environment including a plurality of regions of nodes and the requesting comprising sending a request for exclusive access to at least multiple regions of nodes of the plurality of regions of nodes, wherein one region of nodes of the plurality of regions of nodes includes a plurality of nodes, the plurality of nodes comprising the node requesting exclusive access and another node of the computing environment, wherein the node requesting exclusive access and the another node are local to one another as defined by a predetermined criteria, and wherein at least one node of the node requesting exclusive access and the another node includes a plurality of processors; and
   facilitating, based on the requesting of exclusive access, shared read-only invalidating for the selected cache line of the cache, where the selected cache line is capable of existing in a shared read-only state in multiple nodes of the computing environment, the facilitating including:
      checking, by the node requesting exclusive access, a locality cache coherency state of the another node of the one region of nodes, the locality cache coherency state being on a per cache line basis to indicate whether a copy of the selected cache line is maintained outside of the plurality of nodes of the one region of nodes, the locality cache coherency state, based on being set to a defined value, indicating that no node outside of the one region of nodes has a copy of the selected cache line and that at least one node within the one region of nodes has access to the selected cache line; and
      determining, based on the locality cache coherency state indicating that the another node has access to the selected cache line, that the node requesting exclusive access is to be granted exclusive access to the selected cache line, the determining being independent of transmission of information relating to the selected cache line from one or more other nodes of one or more other regions of nodes of the plurality of regions of nodes, and wherein, based on the locality cache coherency state indicating that the another node has access to the selected cache line, the determining ignores information, other than provided by the locality cache coherency state of the another node, of whether nodes outside of the one region of nodes have copies of the selected cache line.

19. The computer-implemented method of claim 18, wherein the requesting includes sending the request to the another node and to the one or more other nodes of the one or more other regions of nodes, and wherein the determining being independent of transmission of information relating to the selected cache line comprises the determining being independent of responses to the request from the one or more other nodes.

20. The computer-implemented method of claim 18, wherein the determining is based exclusively on the locality cache coherency state of the another node, wherein information relating to the selected cache line from the one or more other nodes, if any, is ignored.

\* \* \* \* \*